United States Patent
Meduri

(10) Patent No.: US 8,460,740 B2
(45) Date of Patent: Jun. 11, 2013

(54) FRUIT BREAKING METHOD AND APPARATUS

(75) Inventor: Joseph J. Meduri, Dallas, OR (US)

(73) Assignee: Meduri Farms, Inc., Dallas, OR (US)

( * ) Notice: Subject to any disclaimer, the term of this patent is extended or adjusted under 35 U.S.C. 154(b) by 1511 days.

(21) Appl. No.: 11/271,329

(22) Filed: Nov. 10, 2005

(65) Prior Publication Data
US 2008/0166468 A1 Jul. 10, 2008

(51) Int. Cl.
*A23B 7/024* (2006.01)

(52) U.S. Cl.
USPC .......................................................... 426/639

(58) Field of Classification Search
USPC ..................................... 62/320; 426/639–640
See application file for complete search history.

(56) References Cited

U.S. PATENT DOCUMENTS

| | | | | |
|---|---|---|---|---|
| 2,583,697 A | * | 1/1952 | Hendry, Jr. et al. | 426/393 |
| 3,800,049 A | * | 3/1974 | Larroche et al. | 426/305 |
| 4,604,925 A | * | 8/1986 | Wisdom | 83/13 |
| 4,687,672 A | * | 8/1987 | Vitkovsky | 426/524 |
| 4,713,252 A | * | 12/1987 | Ismail | 426/290 |
| 5,690,725 A | * | 11/1997 | Tucker | 106/217.7 |
| 5,775,603 A | * | 7/1998 | Kohler et al. | 241/23 |
| 6,159,527 A | * | 12/2000 | Wettlaufer | 426/639 |
| 6,183,795 B1 | * | 2/2001 | Yates | 426/385 |
| 2001/0043981 A1 | * | 11/2001 | Lewis et al. | 426/615 |
| 2004/0096559 A1 | * | 5/2004 | Swanson et al. | 426/524 |

OTHER PUBLICATIONS

Dictionary.com definition of the word "shaking". Retrieved Mar. 5, 2010.*

* cited by examiner

*Primary Examiner* — D. Lawrence Tarazano
*Assistant Examiner* — Jenna A Watts
(74) *Attorney, Agent, or Firm* — Kolisch Hartwell, P.C.

(57) ABSTRACT

Methods and apparatus for producing pieces of sweetened, dried fruit. Methods as described in the present disclosure generally include supercooling sweetened, dried fruit having a moisture content between 8% and 18%, and then breaking the supercooled fruit into pieces having an appropriate size distribution. Supercooling the fruit may be accomplished by immersing or otherwise exposing the fruit to a supercooling substance such as liquid nitrogen, liquid oxygen, or solid carbon dioxide. Breaking the fruit may be accomplished, for example, by rapidly vibrating the supercooled fruit on a screen, or by passing the supercooled fruit through a cutting device such as a centrifugal slicer, among others. A system for producing pieces of sweetened, dried fruit may include apparatus for drying the fruit, infusing it with sugar or otherwise sweetening it, immersing or otherwise exposing the fruit to a supercooled substance, and/or breaking the fruit through vibration, cutting, or the like.

1 Claim, 3 Drawing Sheets

FRUIT BREAKING METHOD AND APPARATUS

INTRODUCTION

Dried fruit pieces have a wide range of industrial food uses, such as in cereals, in trail mixes, or as self-contained fruit snacks. In some applications, the fruit may be unsweetened, but in other applications, it is desirable that the fruit pieces be sweetened by infusing them with sugar or another sweetener, such as corn syrup or the like. In either case, whole dried fruit often is too large to be suitable for many commercial purposes, and the fruit therefore must be formed into relatively small pieces in some manner.

Forming fruit, particularly dried fruit, into pieces on an industrial scale may be difficult due to the sticky nature of the fruit. The stickiness of the fruit both causes the pieces to clump together, and also inhibits cutting or breaking the fruit, since any machinery used may become "gummed up" with the sticky fruit pieces. This difficulty may depend on factors such as the sugar content of the fruit, the moisture content of the fruit, and the temperature at which the fruit is cut or otherwise broken. Although the sugar content of the fruit generally is based on the desired end use of the fruit, and is determined prior to forming the fruit in to pieces, the moisture content and temperature of the fruit during cutting or breaking may be adjustable.

The most suitable long-term moisture content of dried fruit may depend upon factors such as whether or not the fruit contains preservatives, and whether or not the fruit is sweetened. For example, unsweetened, unpreserved fruit may be stored with a moisture content of between 22%-25%, which typically is sufficiently low to inhibit the growth of yeast, mold, and other undesirable substances. On the other hand, it may be desirable to dry sugar-infused or otherwise sweetened fruit to a lower moisture content, such as between 8%-18%, since the presence of more sugars generally is more conducive to undesirable growths. Furthermore, a lower moisture content may make dried fruit more brittle and/or less sticky, which may be advantageous for some methods of breaking or cutting the fruit.

Various methods have been developed for overcoming the inherent stickiness of dried fruit and successfully forming it into small pieces. One such method includes coating the fruit with a nonstick agent, such as oil or cornstarch, either before or after cutting the fruit. While this generally is an effective way of preventing clumping of fruit pieces after they are formed, it does little to affect the stickiness of the interior of the fruit, which is primarily what makes large-scale cutting or breaking difficult. Another method is to grind dried fruit into a paste, and then to form the paste into small pieces, with or without a nonstick coating. However, the fruit pieces formed by this method tend to absorb moisture, which may lead to undesirable growth of yeast or mold as previously described. Such fruit pieces also may suffer from a loss of integrity (i.e., they may fall apart), and they may be aesthetically less appealing than fruit pieces formed by other methods.

Methods of processing fruit that include freezing the fruit also have been developed. Factors such as the moisture content of the fruit, the sugar content of the fruit, and the intended use of the fruit may influence which of these methods is most suitable. For example, sweetened jams and jellies may be manufactured by freezing whole, dried or undried fruit, pulverizing the frozen fruit, and then defrosting and/or drying the pulverized fruit with the addition of a sweetener. However, sweetened pulverized fruit generally is not appropriate for cereals and other similar dried fruit applications. A method of cryogenically freezing and then shattering dried fruit is disclosed in U.S. Pat. No. 6,183,795, issued Feb. 6, 2001. However, the disclosed method is limited to unsweetened fruit having a moisture content of at least 22%, and therefore is unsuitable for use with sugar-infused or otherwise sweetened fruit. This method is further limited to forming shattered fruit pieces with a roller mill or tumbler, which tends to form pieces with randomly distributed sizes.

Thus, a need exists for an effective method of forming pieces of sugar-infused or otherwise sweetened dried fruit, preferably having a relatively uniform and/or controllable size distribution.

SUMMARY

The present teachings provide a method and apparatus for producing pieces of sweetened, dried fruit. Methods as described in the present disclosure generally include supercooling sweetened, dried fruit having a moisture content between 8% and 18%, and then breaking the supercooled fruit into pieces having an appropriate size distribution. Supercooling the fruit may be accomplished by immersing or otherwise exposing the fruit to a supercooling substance such as liquid nitrogen, liquid oxygen, liquid carbon dioxide, or solid carbon dioxide. Breaking the fruit may be accomplished, for example, by rapidly vibrating the supercooled fruit on a screen, or by passing the supercooled fruit through a cutting device such as a centrifugal slicer, among others. In some embodiments, the method also may include drying the fruit prior to breaking it into pieces, infusing the fruit with sugar before supercooling it, and/or drying the fruit after breaking it into pieces.

A system for producing the pieces of sweetened, dried fruit according to aspects of the present teachings may include apparatus for drying the fruit, infusing it with sugar or otherwise sweetening it, immersing or otherwise exposing the fruit to a supercooled substance, and/or breaking the fruit through vibration, milling, cutting, or the like.

DETAILED DESCRIPTION

The present teachings provide methods and apparatus for mechanically sizing sweetened, dried fruit through by supercooling and then breaking the fruit. In some embodiments, the fruit may be sweetened by infusing it with sugar, for example in a sugar bath, whereas in other embodiments the fruit may be pre-sweetened prior to application of the presently disclosed methods and apparatus. The sweetened fruit either has moisture content of between 8%-18% or may be dried to a moisture content within that range, and then supercooled by exposure to a supercooling substance such as liquid nitrogen, liquid oxygen, liquid helium, liquid carbon dioxide, or solid carbon dioxide (dry ice), among others. The supercooled fruit then is mechanically broken by any suitable means such as vibration, centrifugal breaking, or milling.

Figure 1:
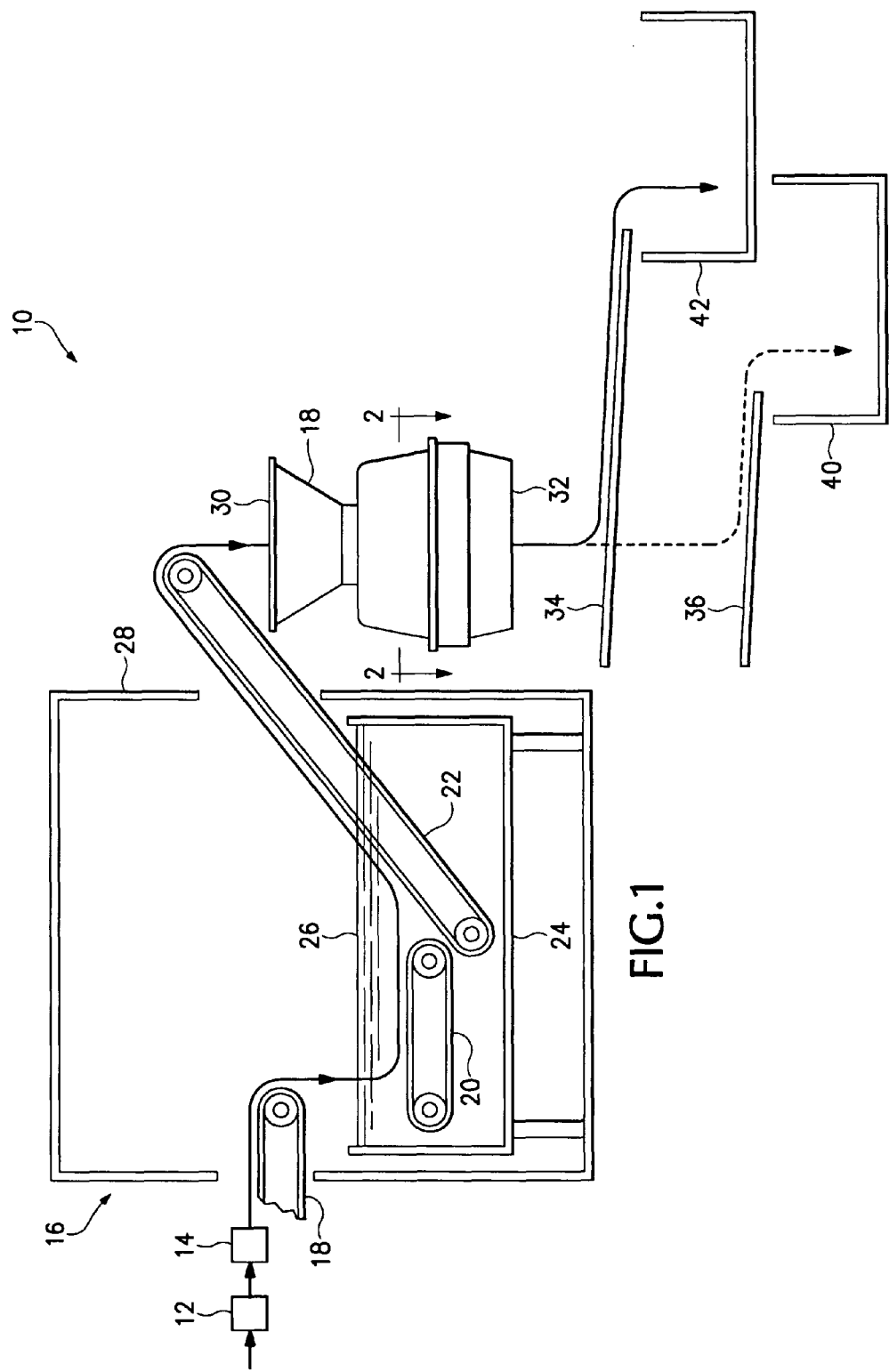
FIG. 1 is a schematic diagram showing a system for mechanically breaking sweetened, dried fruit according to aspects of the present disclosure.

FIG. 1 schematically depicts a system 10 for supercooling and mechanically breaking sweetened, dried fruit. System 10 includes a sugar infusing device 12, a dehydrator 14, a supercooling freezer generally indicated at 16, and a mechanical breaking device 18 for breaking supercooled fruit. Sugar infusing device 12 may be, for example, a sugar bath within which either dried or undried fruit is soaked until the fruit is infused with sugar to a desired degree. In some cases, the fruit may absorb moisture during the infusion process. In other cases, such as in the case of undried cranberries, the fruit may become dehydrated during infusion, due to osmosis of the water in the fruit towards the more concentrated liquid outside the fruit's outer skin.

The degree of sugar infusion provided by the sugar infusing device may depend on the particular application of the system or type of fruit being infused, with typical amounts of sugar infusion falling in the range of 25%-50% infusion by weight. Fruit to be infused may be placed in the infusing device and then removed some time later in a discontinuous process, or it may be conveyed through the infusing device in a continuous manner, for example by a conveyor belt or any other similar mechanism. Furthermore, infusing device 12 may be used to infuse fruit with sweeteners other than sugar, such as low-calorie sweeteners, sugar substitutes of any kind, or flavored syrups of various types.

Dehydrator 14 is configured to dehydrate fruit to a desired degree, typically 8%-18% moisture content in the case of sugar-infused fruit. The dehydrator may be of any suitable type, such as a tray dryer, belt dryer, bin dryer, or kiln, among others. As in the case of infusing device 12, fruit to be dried may be placed in the dehydrator and removed later in a discontinuous process, or it may be conveyed through the dehydrator in a continuous manner. If conveyed continuously, the conveyance speed may be adjusted to provide the desired degree of dehydration in light of factors such as the particular fruit being processed, its sugar content, the desired size range of broken fruit pieces, and/or other relevant factors.

Supercooling freezer 16 is shown schematically as including a system of conveyor belts 18, 20, and 22, which respectively convey dried fruit into, through, and out of the freezer. For example, dehydrated fruit may be conveyed into freezer 16 by conveyor belt 18, pass into a tank 24 containing a supercooling substance 26, be conveyed through the supercooling substance by belt 20, and then be conveyed out of tank 24 and freezer 16 by belt 22. However, it should be appreciated that the precise mechanism for conveying the dried fruit into and out of the freezer is of no particular consequence, so long as the fruit is supercooled while in the supercooling freezer. Freezer 16 may include an external housing 28, which may be suitably insulated to prevent excess evaporation of the supercooling substance or other heat losses. The freezer also may be contained in a cooled environment, to further limit unwanted heat transfer within or out of the system.

To accomplish supercooling the fruit, the supercooling freezer should be configured to expose the fruit to a suitably chosen supercooling substance 26. The supercooling substance is preferably liquid nitrogen, although other supercooling substances, such as liquid oxygen, liquid helium, liquid carbon dioxide, solid carbon dioxide flakes (i.e., dry ice), or the like also may be suitable. In the case of a supercooling liquid, the fruit may be exposed to the liquid simply by immersing the fruit in the liquid for a desired amount of time, as indicated in FIG. 1. Alternatively, the fruit may be sprayed with a supercooling liquid, or indirectly exposed to the supercooling substance by passing the fruit through supercooled air in the vicinity of the substance. Indirect exposure of the fruit to the supercooling substance may be particularly appropriate in cases where the supercooling substance is a supercooling solid such as dry ice.

The choice of a supercooling substance may be influenced, for example, by the expense of the substance, and/or the desired supercooled temperature of the fruit. For example, liquid nitrogen boils at typical atmospheric pressures at a temperature of approximately 77 degrees Kelvin (K), or roughly −320 degrees Farenheit (F), whereas liquid oxygen boils at approximately 90 K (−297 F), liquid helium boils at approximately 4 K (−452 F), and dry ice sublimates at approximately 195 K (−109 F). Thus, a wide range of supercooling temperatures may be available, depending upon the choice of supercooling substance. Generally speaking, a colder temperature of the fruit will make the fruit more brittle, which may lead to smaller pieces of fruit when the fruit is subsequently mechanically broken as described below. A suitable range of supercooled temperatures for most fruits, i.e. one leading to appropriately sized pieces of broken fruit, is between approximately 88 K (−300 F) and 127 K (−230 F). Thus, liquid nitrogen is often a particularly appropriate supercooling substance.

System 10 also includes a mechanical breaking device such as device 18 depicted in FIG. 1. Breaking device 18 is configured to break the supercooled fruit into pieces of a desired size, which for most applications is in the range of 1/8"-3/8", and in some applications may be in the range of 1/8"-1/4". The breaking device generally includes an entry 30 for receiving supercooled fruit, and an exit 32 through which pieces of broken fruit leave the device. Device 18 shown in FIG. 1 is a centrifugal slicer, but other suitable breaking devices include, for instance, rotating milling machines, vibrating screens, and the like, some examples of which will be described below in greater detail. In some cases, also described below, the breaking device further may be configured to contain or to receive a supercooling substance, so that in addition to breaking the fruit, the breaking device may perform some or all of the supercooling functions of freezer 16.

In some embodiments, system 10 also may include a substantially planar screen 34 onto which pieces of fruit fall or are placed after passing through breaking device 18. It should also be appreciated that in some embodiments of system 10, breaking device 18 may be omitted, and the fruit may pass directly to screen 34 after exiting the supercooling freezer. In these cases, the screen itself may function as a breaking device, as described below. Screen 34 may be a sizing screen configured to separate pieces having sizes greater than a predetermined size from pieces having sizes less than that size, for instance by having appropriately sized apertures through which only certain pieces may pass. To facilitate this separation, screen 34 may be configured to vibrate sufficiently to cause small pieces to pass through its apertures, and/or may be tilted at a slight downward angle, as FIG. 1 indicates.

Screen 34 also may be configured to vibrate sufficiently vigorously that the vibration of the screen causes frozen fruit disposed on the screen to break into pieces, in which case the vibrating screen may perform some or all of the functions of the breaking device. When vigorous vibration of screen 34, which also may function as a sizing screen, breaks the fruit, another breaking device such as breaking device 18 may be omitted from the system as discussed above. In either case, broken pieces of fruit having sizes smaller than a desired maximum may fall through apertures in screen 34 and onto secondary screen 36, which conveys these pieces into a receptacle 40 for collection. Screen 36 also may be tilted slightly, and in some embodiments may be configured to vibrate to facilitate motion of fruit pieces into receptacle 40. Screen 36 also may take the form of a conveyor belt, or any other suitable mechanism, for transporting fruit pieces to a collection point. On the other hand, fruit pieces that are too large to pass through sizing screen 34 may be collected in another receptacle 42, and then rebroken using one or both of breaking device 18 or vibrating screen 34. The overly large pieces may be moved back to the breaking device or vibrating screen either be hand, or through the use of an automated system (not shown).

Figure 2:
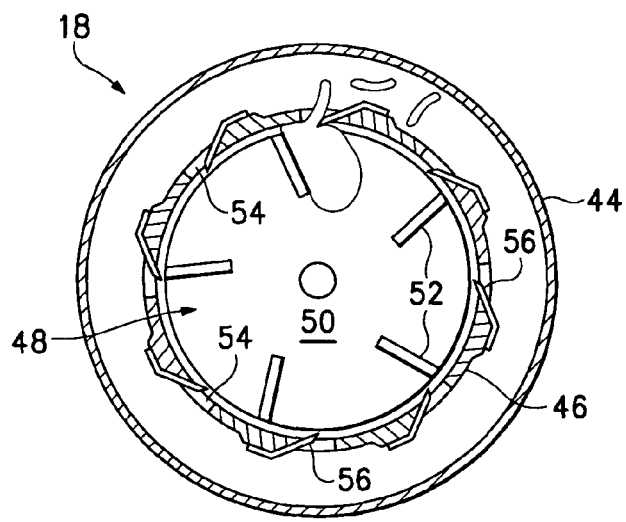
FIG. 2 is a sectional view of a portion of the mechanical breaking device for breaking supercooled, dried fruit shown in FIG. 1.

FIG. 2 is a sectional view taken along line 2-2 of FIG. 1, showing details of the internal structure of breaking device 18. As already described, device 18 is a centrifugal slicer, a suitable model of which is the Model CC slicer manufactured by Urschel Laboratories, Inc. of Valparaiso, Ind. Slicer 18 includes an outer housing 44, an inner housing 46, and an impeller portion 48 configured to rotate rapidly. The impeller portion includes a lower surface 50, and a plurality of impeller blades 52. When the impeller portion rotates, the inertia of any supercooled fruit disposed on surface 50 causes those pieces to slide to the outer portions of the impeller, where they contact inner housing 46 and/or one of impeller blades 52.

One or a plurality of impacts of the supercooled fruit with the impeller blades 52 and/or inner housing 46 may cause the fruit to break into pieces, and this breakage may occur repeatedly until the fruit pieces are sufficiently small to fit through one of apertures 54 in the inner housing. Since apertures 54 may be adjustable to have any desired size, the centrifugal slicer is thus configured to rotate rapidly enough to force the supercooled fruit through an aperture of any predetermined size. In some embodiments, breaking the fruit may be further facilitated by sharp blades 56 attached to the inner housing and disposed adjacent to apertures 54, in a manner such that fruit approaching any of apertures 54 will contact one of blades 56 and be additionally broken or sliced so that a portion will fit through the aperture. In other embodiments, however, blades 56 may be omitted, in which case the impact of the supercooled fruit with portions of the interior of device 18 may be sufficient to break the fruit into pieces having the desired size distribution.

Figure 3:
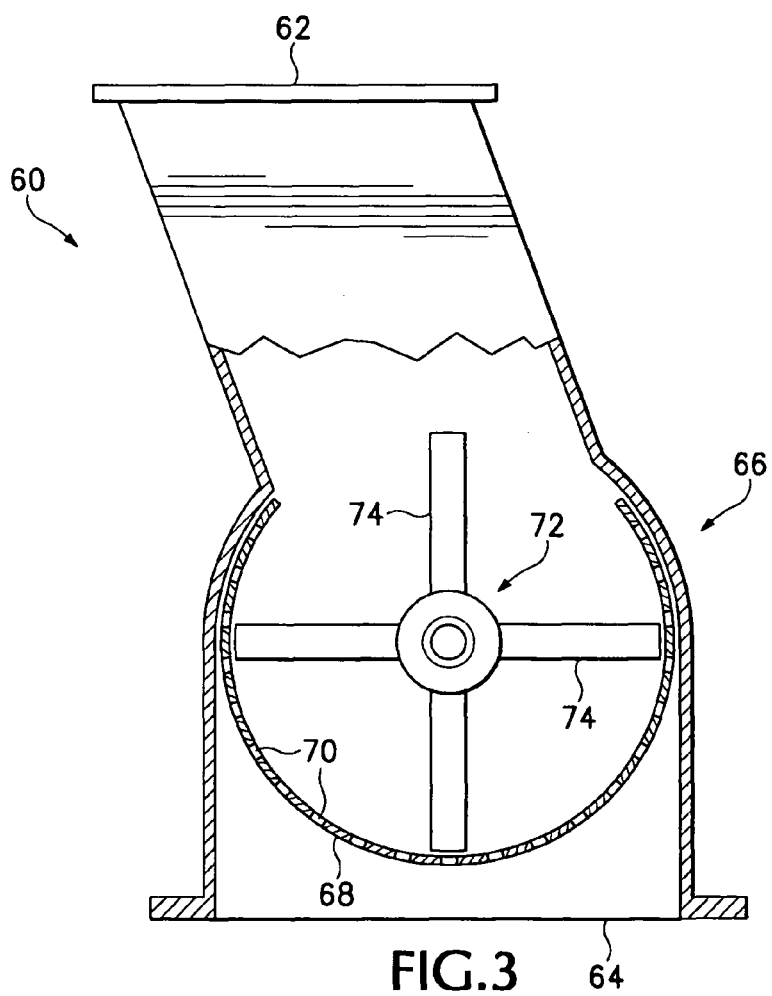
FIG. 3 is a sectional view of a portion of an alternative mechanical breaking device for breaking supercooled, dried fruit according to aspects of the present disclosure.

FIG. 3 shows a sectional view of an alternate embodiment of a breaking device 60 that may be used instead of centrifugal slicer 18 in system 10. Breaking device 60 is a rotating cutting mill, a suitable model of which is a FitzMill Comminutor, manufactured by the Fitzpatrick Company of Elmhurst, Ill. Cutting mill 60 includes an entry opening 62, an exit 64, and a milling region 66. Milling region 66 includes an arcuate screen 68, within which a plurality of apertures 70 are disposed, and a rotor assembly 72 having either a fixed or a variable rotational speed. A variable rotational speed may be preferable, for reasons described below. Screen 68 may be interchangeable, so that screens having apertures of any desired size may be chosen for a given application. Rotor assembly 72 includes a plurality of rotor blades 74 which also may be interchangeable, to provide varying degrees of cutting or breaking effectiveness.

When cutting mill 60 is used within a system such as system 10, supercooled fruit enters the mill through entry opening 62 and passes into milling region 66, where it impacts one or more blades 74, and/or screen 68. Depending on the brittleness (and thus the sugar content, moisture content, and/or the temperature) of the fruit, the fruit may break more or less easily within the milling region, requiring more or less breaking to be done by the rotating blades of the rotor assembly. Thus the brittleness of the fruit, and the desired size distribution of the broken pieces, may be important factors in determining what type of rotor blades will be used, and the most appropriate rotational speed of the rotor assembly. For this reason, a variable speed rotor assembly may be preferable to one having a fixed rotational speed.

Fruit pieces within milling region 66 may continue to break or fragment until they are small enough to fit through one of apertures 70, at which point the fruit typically will be forced through one of the apertures by the combined action of gravity and the rotating blades of the rotor assembly. Thus, the predetermined dimensions of apertures 70 partially determine the final size of the broken fruit pieces. After passing through the milling region, the now appropriately sized broken fruit pieces exit the milling machine through exit 64. Upon exiting the milling machine, the fruit pieces may contact one or more screens such as sizing screen 34 and/or secondary screen 36, for sorting and/or additional vibrational breaking as described above. Alternatively, if it has been determined that the pieces are substantially correctly sized, the broken pieces may exit the milling machine directly into a collection receptacle with no additional sorting.

In some embodiments (not shown), the breaking device may be configured to hold or receive a quantity of supercooling agent such as liquid nitrogen or another supercooling liquid, or to otherwise expose fruit passing through the device to such an agent. For example, a cutting mill such as mill 60 may be configured so that a supercooling liquid such as liquid nitrogen, liquid oxygen, or liquid carbon dioxide may be injected or sprayed into the milling region of the cutting mill. Injection of the supercooling liquid in this manner may be done either to replace supercooling the fruit in a dedicated supercooling freezer, or to supplement the supercooling freezer. In other words, the milling machine may be configured so that supercooling the fruit occurs at least partially, and in some embodiments entirely, within the milling machine.

Figures 4, 5:
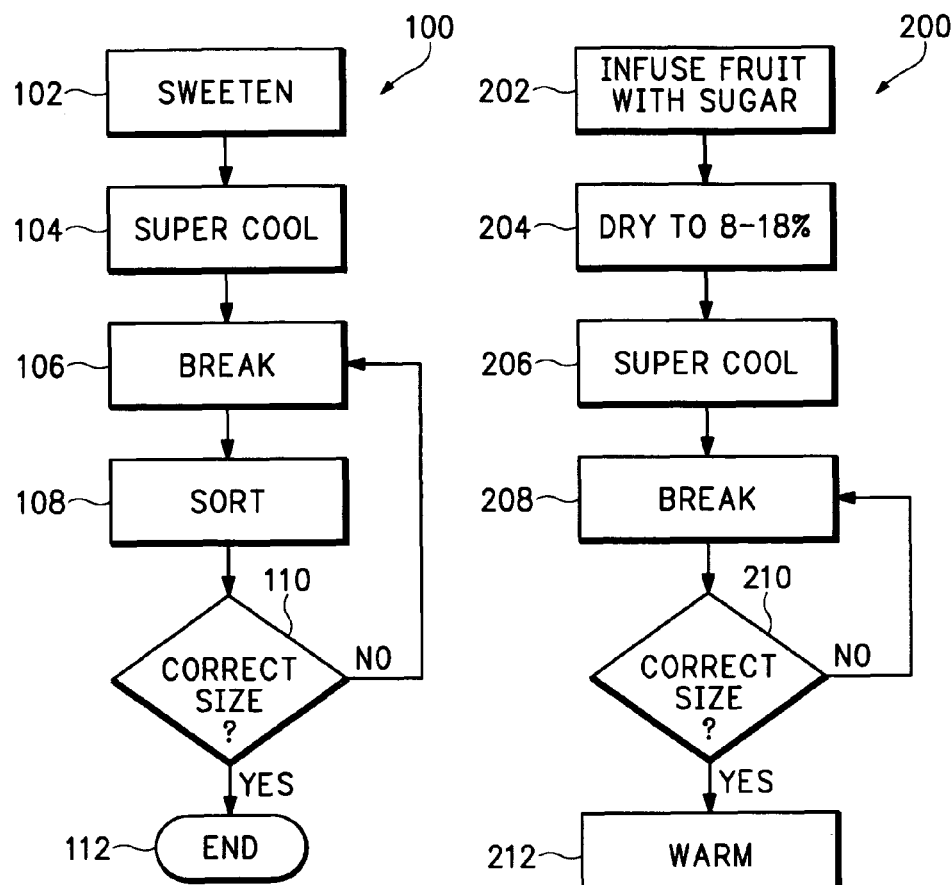
FIG. 4 is a flow chart depicting a method of mechanically sizing sweetened, dried fruit according to aspects of the present disclosure.
FIG. 5 is another flow chart depicting an alternate method of mechanically sizing sweetened, dried fruit according to aspects of the present disclosure.

FIG. 4 is a flowchart illustrating a possible method, generally indicated at 100, for mechanically sizing fruit according to the present teachings. In a first step 102, dried fruit is sweetened or otherwise infused with sugar. Alternatively, the infusion itself may serve to partially dehydrate the fruit due to osmosis, as has previously been described. Furthermore, in another embodiment, described below, the infused fruit may be dried to a desired moisture content after infusion with sugar. In any case, the preferable moisture content of the sweetened fruit prior to supercooling is 8%-18%. Generally, in step 102 the fruit will be sweetened to have a predetermined sugar content, which may, for example, fall in the range of 25%-50% by weight. Infusing the fruit with sugar may be accomplished by a variety of methods, preferably by soaking the fruit in a sweetened solution.

In step 104, sweetened, dried fruit is supercooled. Supercooling the fruit generally includes exposing the fruit to a supercooling substance such as liquid nitrogen, liquid oxygen, liquid carbon dioxide, liquid helium, or solid carbon dioxide, among others. In some cases, supercooling may involve immersing the fruit in a supercooling liquid, while in other cases, it may involve exposing the fruit to the supercooling substance through spraying, blowing, or by any other suitable means. This may occur within a dedicated supercooling freezer, or as described below, it may occur at least partially within a device that also serves another purpose, such as within a mechanical breaking device. The fruit may be supercooled to any desired temperature, and in some cases (depending on the particular type of fruit, the moisture content, and/or the degree of sugar infusion) colder temperatures may be correlated to more brittle fruit and, ultimately, to smaller pieces of broken fruit. A suitable temperature range from most fruits is from 88-127 degrees Kelvin (from −300 to −230 degrees Farenheit).

After supercooling, the supercooled fruit is broken in step 106. Breaking the fruit may be accomplished by any suitable means, including all of those previously described in this disclosure. For example, breaking the fruit may include vibrating the fruit on a screen, which also may have apertures of a predetermined size so that it functions as a sorting or sizing screen. Alternatively or in addition, breaking the fruit may include forcing the fruit through an aperture of predetermined size, for example by passing the fruit through a mechanical breaking device such as a centrifugal slicer or a rotating milling machine. Many other suitable breaking devices and techniques are possible. In some cases, supercooling the fruit may occur at least partially within the breaking device. For instance, fruit within a milling machine may be sprayed with or otherwise exposed to a supercooling liquid such as liquid nitrogen or liquid carbon dioxide. This supercooling within the milling machine may replace, or merely may supplement, supercooling in a dedicated supercooling freezer.

After breaking, the fruit may be sorted by size as indicated in step 108. This sorting may be accomplished, for example, using one or a series of sorting or sizing screens, each having apertures of a predetermined size through which pieces of fruit may fall, while those pieces having sizes larger than the predetermined size are prevented from passing through the apertures. In this manner, the fruit may be sorted into any desired number of size categories. In one simple embodiment, as indicated at steps 110 and 112, fruit having a correct size may be sent to a collection bin or the like, at which point the breaking process is at an end, whereas fruit having too large a size may be rebroken in a repetition of step 106. The cycle of breaking, sorting, and rebreaking may be continued until all of the fruit is broken into pieces within any desired range of sizes, which in typical applications is between ⅛ and ⅜ inches.

FIG. 5 illustrates an alternative method, generally indicated at 200, for mechanically sizing fruit according to the present teachings. Method 200 is similar in many regards to method 100 illustrated in FIG. 4, but with several possible distinctions. After infusing fruit with sugar in step 202, the fruit may be dried in step 204 to a desired moisture content, which preferably is in the range of 8%-18%. Drying may be accomplished by any suitable means, including in a commercial dryer such as a tray dryer, belt dryer, bin dryer, or kiln, among others. The moisture content to which the infused fruit is dried may depend on factors such as the type of fruit, the sugar content of the fruit, and the desired sizes of the broken pieces of fruit at the end of the breaking process.

After sugar infusion and drying, the fruit may be supercooled and broken at steps 206 and 208, respectively, in a manner similar to steps 104 and 106 described above. In this process, as indicated at step 210, fruit not broken to a correct or desired size may automatically be rebroken, without a separate sorting step. For instance, the breaking mechanism used at step 208 may have an integrated sizing screen, such as screen 68 of cutting mill 60 described previously. In this case, fruit pieces having less than some predetermined maximum allowable size may exit the breaking device, whereas fruit pieces having sizes larger than the predetermined maximum may simply remain within the breaking device, to be rebroken until they reach an appropriate size within the desired range.

At step 212, broken fruit pieces may be warmed to a desired temperature above the supercool temperature achieved in supercooling step 206. For example, the pieces may be warmed to room temperature, or to near room temperature. In this warming step, the fruit pieces may naturally absorb some amount of moisture, e.g. through normal condensation due to the temperature difference between the cold fruit and the warmer surrounding air. Therefore, as indicated at step 214, the moisture content of the fruit pieces may be measured again when they attain a desired temperature after the warming step. If the fruit pieces are too moist, which typically means a moisture content greater than 18% to avoid unwanted growth of substances such as mold or yeast, the fruit may be redried in a second drying step 216. Step 216 may be accomplished using either the same dryer as the dryer used in step 204, or using a separate dedicated dryer. In either case, or if the fruit had an appropriate moisture content when initially measured at step 214, the process may end at step 218 with the sweetened fruit broken into appropriately sized pieces having an appropriate moisture content.

The disclosure set forth above may encompass multiple distinct inventions with independent utility. The disclosure includes a number of section headings, which were added for convenience, and which are not intended to limit the disclosure in any way (e.g., the headings to not foreclose using information described in one section in place of, and/or in combination with, information described in other sections). Similarly, the disclosure relates information regarding specific embodiments, which are included for illustrative purposes, and which are not to be considered in a limiting sense, because numerous variations are possible. The inventive subject matter of the disclosure includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. A method for mechanically sizing fruit, comprising the steps of:
   drying the fruit to a moisture content in the range of 8%-18%;
   supercooling the fruit, wherein the fruit has a moisture content in the range of 8%-18% at the beginning of the supercooling step; and
   mechanically breaking the supercooled fruit into pieces;
   wherein breaking the fruit includes forcing the fruit through an aperture of predetermined size, and forcing the fruit through an aperture of predetermined size includes passing the fruit through a centrifugal slicer.

* * * * *